M. H. GROB.
MILK BOTTLE HOLDER.
APPLICATION FILED FEB. 17, 1917.
1,244,050.
Patented Oct. 23, 1917.
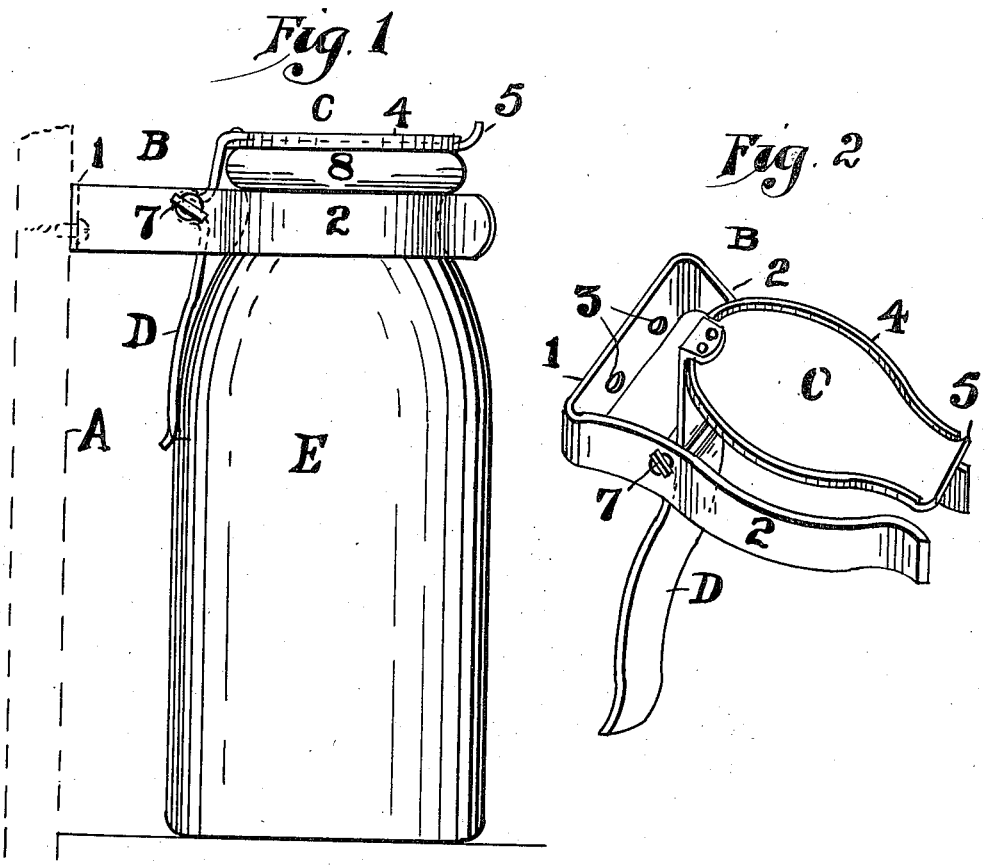
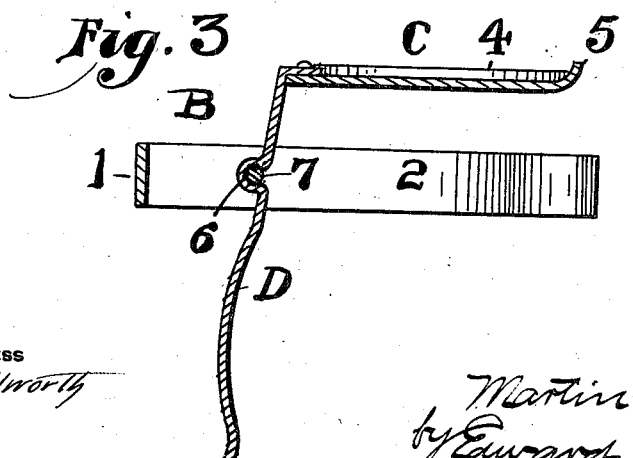
WITNESS
T. F. Dilworth
INVENTOR.
Martin H. Grob,
by Edward A. Laurence
his attorney.

UNITED STATES PATENT OFFICE.

MARTIN H. GROB, OF SHARPSBURG BOROUGH, PENNSYLVANIA.

MILK-BOTTLE HOLDER.

1,244,050.　　　　　　Specification of Letters Patent.　　Patented Oct. 23, 1917.

Application filed February 17, 1917. Serial No. 149,176.

*To all whom it may concern:*

Be it known that I, MARTIN H. GROB, a citizen of the United States, and residing in the borough of Sharpsburg, in the county of Allegheny and State of Pennsylvania, have invented or discovered new and useful Improvements in Milk-Bottle Holders, of which the following is a specification.

My invention consists in a new and improved holder or support for the suspension of milk and cream bottles and similar receptacles or objects.

The object in view is the provision of means whereby the bottle may be kept without danger of its contents being spilled or contaminated, and into which the bottle may be readily introduced and from which it may be removed with ease and despatch.

For the accomplishment of this purpose, I have devised the holder hereinafter more fully described, and which, generally speaking, consists of a metal yoke whose jaws are resilient and adapted to clasp the neck of the bottle below its top flange or lip, the bottle being prevented from slipping down through the yoke by the contact therewith of the top flange or lip of the bottle.

The holder is also provided with a lid pivotally mounted on the yoke member and held down over the top of the bottle for its protection by pressure of the body of the bottle against a depending lever attached to the lid and located in the path of the bottle as the latter is pushed between the jaws of the yoke.

In the accompanying drawings, Figure 1 is a side elevation showing a milk bottle mounted in my improved holder; Fig. 2 is a perspective of the holder removed from the wall or other support, and Fig. 3 is a vertical section of the holder.

The following is a detailed description of the drawings.

A represents a vertical wall post, or other support. B is a yoke of metal comprising the horizontal back plate 1 and, integral with the same, the concavely curved spring arms 2. The plate 1 is provided with screw holes 3 whereby the yoke may be secured mounted on the fixed support A, as shown in Fig. 1.

C is a lid or cover, large enough to amply cover the top of a milk or other bottle. I prefer to make this lid of aluminum or other easily cleansed metal which will not contain acids affecting the milk or cream. I prefer to strengthen the lid by means of an upturned edge flange 4 extended in front to form a grasping tongue 5.

D is a depending lever of somewhat resilient metal having its upper end securely fastened to the rear of the lid C and provided near its upper end with a crimped bearing 6 for a supporting pin 7 whose ends extend through the rear portions of the arms 2. The rivet is made of sufficient length so as not to interfere with the free expansion of the arms 2, and at its extreme ends is flattened out and squared to prevent its withdrawal through the holes in the arms 2.

The lower portion of the lever D is bent or curved to roughly correspond with the contour of the body of the milk bottle.

E represents a milk bottle provided with the usual top rim or lip 8; and below the same flaring out to cylindrical form for its body portion.

The lower portion of the lever D—that is the portion of said lever below the pin 7—is preferably made of sufficient length or weight to overbalance the lid C, so that the lid will not drop forwardly when the holder is empty but will maintain substantially the position shown in Figs. 2 and 3.

The neck of the bottle E is pushed horizontally between the arms 2 which are curved outwardly at their ends to facilitate the introduction of the bottle neck. The bottle neck thus seats between and is resiliently clasped by the arms 2 and the lip 8 of the bottle prevents it from slipping down through the yoke.

The pressure of the body of the bottle against the lower portion of the lever D forces the lid C down onto the top of the bottle, thus preventing dogs or cats from gaining access to the paper cap or contents of the bottle, since the lid C cannot be raised from the top of the bottle without first removing the bottle from the holder.

The bottle may be readily drawn horizontally from the holder when its contents are needed for use.

The holder may be easily washed or kept sanitary.

In addition to preventing animals from gaining access to the contents of the bottle, by securely suspending the bottle in a safe place, instead of standing it on a shelf or porch floor, the frequent upsetting of the bottle, attended by the loss of its contents and the breakage of the bottle itself, is prevented.

The device is inexpensive and simple, and, as it contains no fragile or complicated parts, it is very durable and serviceable.

What I desire to claim is:—

1. A combined milk bottle holder and closure, comprising a suspension member adapted to be secured to a support and provided with a pair of integrally curved resilient arms adapted to clasp the neck of a bottle to support the same, a lever pivotally mounted intermediate of its ends between the shanks of said arms, and a lid attached to the upper end of said lever and adapted to be pressed down on the mouth of the bottle by the pressure of the body of the latter against the lower end of said lever, substantially as and for the purpose set forth.

2. In a bottle holder and closure, the combination of a yoke adapted to be rigidly secured to a support provided with a pair of resilient clasping arms between which the neck of the bottle is introduced, a lid adapted to close the mouth of the bottle, and a lever depending from said lid in the path of the bottle as it is introduced into the holder whereby said lid is positively held in operative position as long as the bottle remains in the holder.

3. In a bottle holder and closure, a yoke adapted to be rigidly secured to a support comprising a pair of resilient clasping arms between which the neck of the bottle is introduced, a lid adapted to close the mouth of the bottle, and a lever pivotally supported between the arms, the upper end of said lever being secured to the rear of said lid while the lower end of said lever depends in the path of the body of the bottle as the latter is introduced into said holder whereby the lid is positively held over the mouth of said bottle as long as the bottle remains in the holder.

Signed at Sharpsburg, Penna., this 14th day of February 1917.

MARTIN H. GROB.